US 10,831,816 B2

United States Patent
Wu et al.

(10) Patent No.: US 10,831,816 B2
(45) Date of Patent: Nov. 10, 2020

(54) METHOD FOR CONTROLLING ELECTRONIC PICTURE FRAME, ELECTRONIC PICTURE FRAME, ELECTRONIC PICTURE FRAME CLOUD PLATFORM AND MOBILE TERMINAL

(71) Applicants: K-TRONICS (SUZHOU) TECHNOLOGY CO., LTD., Jiangsu (CN); BOE TECHNOLOGY GROUP CO., LTD., Beijing (CN)

(72) Inventors: Huixiang Wu, Beijing (CN); Haitang Xu, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 31 days.

(21) Appl. No.: 16/316,084

(22) PCT Filed: May 10, 2018

(86) PCT No.: PCT/CN2018/086300
§ 371 (c)(1),
(2) Date: Jan. 8, 2019

(87) PCT Pub. No.: WO2019/041882
PCT Pub. Date: Mar. 7, 2019

(65) Prior Publication Data
US 2019/0220477 A1    Jul. 18, 2019

(30) Foreign Application Priority Data

Aug. 31, 2017 (CN) ............ 2017 1 0775453

(51) Int. Cl.
| | | |
|---|---|---|
| G06F 16/438 | (2019.01) | |
| H04L 29/06 | (2006.01) | |
| H04L 29/08 | (2006.01) | |
| G06F 3/0484 | (2013.01) | |
| H04W 12/08 | (2009.01) | |
| H04W 12/00 | (2009.01) | |

(52) U.S. Cl.
CPC ...... *G06F 16/4393* (2019.01); *G06F 3/04847* (2013.01); *H04L 63/08* (2013.01);
(Continued)

(58) Field of Classification Search
CPC . G06F 16/4393; G06F 3/04847; H04L 63/08; H04L 67/303; H04W 12/003; H04W 12/08
See application file for complete search history.

(56) References Cited

U.S. PATENT DOCUMENTS

| | | | |
|---|---|---|---|
| 2008/0195962 A1 | 8/2008 | Lin et al. | |
| 2009/0178126 A1* | 7/2009 | Du .................... | G06F 21/32 726/6 |

(Continued)

FOREIGN PATENT DOCUMENTS

| | | |
|---|---|---|
| CN | 201286110 Y | 8/2009 |
| CN | 102006680 A | 4/2011 |

(Continued)

OTHER PUBLICATIONS

Search Report and Written Opinion for International Application No. PCT/CN2018/086300 dated Jul. 17, 2018.

(Continued)

*Primary Examiner* — Mohamed A. Wasel
(74) *Attorney, Agent, or Firm* — Calfee, Halter & Griswold LLP

(57) ABSTRACT

A method for controlling an electronic picture frame and corresponding devices. An electronic picture frame cloud platform is configured to verify account information of a mobile terminal after receiving a request for operating the electronic picture frame sent by the mobile terminal through the Internet protocol address of the electronic picture frame. It is configured to allow the mobile terminal to operate the electronic picture frame through the Internet protocol (Continued)

address of the electronic picture frame if the account information is verified to be the pre-stored account information bound to the Internet protocol address of the electronic picture frame; otherwise, it prohibits the mobile terminal to operate the electronic picture frame through the Internet protocol address of the electronic picture frame.

15 Claims, 12 Drawing Sheets

(52) U.S. Cl.
CPC .......... *H04L 67/06* (2013.01); *H04W 12/003* (2019.01); *H04W 12/08* (2013.01)

(56) References Cited

U.S. PATENT DOCUMENTS

| | | |
|---|---|---|
| 2009/0295991 A1 | 12/2009 | Stafford et al. |
| 2010/0110313 A1* | 5/2010 | Souders ............ H04M 1/72522 348/836 |
| 2011/0055774 A1 | 3/2011 | Kim et al. |

FOREIGN PATENT DOCUMENTS

| | | |
|---|---|---|
| CN | 102724299 A | 10/2012 |
| CN | 103369034 A | 10/2013 |
| CN | 103501329 A | 1/2014 |
| CN | 103529765 A | 1/2014 |
| CN | 103957249 A | 7/2014 |
| CN | 103986778 A | 8/2014 |
| CN | 106161385 A | 11/2016 |
| CN | 106911642 A | 6/2017 |
| CN | 107509198 A | 12/2017 |

OTHER PUBLICATIONS

First Office Action for Chinese Patent Application No. 201710775453.5 dated May 30, 2019.
Third Office Action for Chinese Patent Application No. 201710775453.5 dated May 7, 2020.
Decision on Rejection for Chinese Patent Application No. 201710775453.5 dated Jul. 1, 2020.

* cited by examiner

METHOD FOR CONTROLLING ELECTRONIC PICTURE FRAME, ELECTRONIC PICTURE FRAME, ELECTRONIC PICTURE FRAME CLOUD PLATFORM AND MOBILE TERMINAL

RELATED APPLICATION

The present application is the U.S. national phase entry of PCT/CN2018/086300, with an international filing date of May 10, 2018, which claims the benefit of Chinese Patent Application No. 201710775453.5, filed on Aug. 31, 2017, the entire disclosure of which is incorporated herein by reference.

TECHNICAL FIELD

The present disclosure relates to the field of display technologies, in particular to a method for controlling an electronic picture frame, an electronic picture frame, an electronic picture frame cloud platform and a mobile terminal.

BACKGROUND

The electronic picture frame is a new display medium, and it is a sign of paperless process. The electronic picture frame can store a large number of pictures for displaying. As a high-end home or venue decoration, the electronic picture frame has an exquisite and novel appearance.

While the electronic picture frame brings convenient display, people begin to make requirements on security of display of the electronic picture frame. The situation at present is that anyone can display pictures on the electronic picture frame or copy pictures from the electronic picture frame, so virus affected files might be easily uploaded into the electronic picture frame or personal privacy might be disclosed.

SUMMARY

In view of this, embodiments of the present disclosure provide a method for controlling an electronic picture frame, an electronic picture frame, an electronic picture frame cloud platform and a mobile terminal to solve some or all of the currently existing problems.

According to a first exemplary embodiment of the present disclosure, a method for controlling an electronic picture frame is provided, which comprises:

receiving a request for operating the electronic picture frame sent by a mobile terminal through an Internet protocol address of the electronic picture frame;

acquiring account information of the mobile terminal;

verifying whether the account information is pre-stored account information bound to the Internet protocol address of the electronic picture frame;

in response to the account information being the pre-stored account information bound to the Internet protocol address of the electronic picture frame, sending a permission to the mobile terminal to allow the mobile terminal to operate the electronic picture frame through the Internet protocol address of the electronic picture frame.

In some embodiments, the above-mentioned method further comprises:

in response to the electronic picture frame being used for the first time:

receiving a registration request carrying registration information of the electronic picture frame and identity information of the mobile terminal sent by the mobile terminal after scanning identification information of the electronic picture frame, wherein the registration information includes unique identity information of the electronic picture frame and the Internet protocol address of the electronic picture frame;

verifying the identity information of the mobile terminal and after passing the verification, binding the account information to the Internet protocol address of the electronic picture frame and storing the account information and the Internet protocol address;

sending to the mobile terminal the account information that has been bound to the Internet protocol address of the electronic picture frame.

In some embodiments, the above-mentioned method further comprises:

receiving position information sent by the electronic picture frame at a predetermined time period;

determining whether the electronic picture frame has moved out of a specified area according to the position information;

in response to determining that the electronic picture frame has moved out of the specified area, sending a lock prompt to the mobile terminal corresponding to the account information that has been bound to the Internet protocol address of the electronic picture frame;

receiving lock reply information sent by the mobile terminal in response to the lock prompt;

in response to determining that the lock reply information is a lock instruction, sending a latch instruction to the electronic picture frame.

In some embodiments, said method further comprises:

receiving monitoring logs sent periodically by the electronic picture frame;

in response to determination of a failure in the electronic picture frame according to the monitoring logs, sending an update prompt to the mobile terminal corresponding to the account information that has been bound to the Internet protocol address of the electronic picture frame;

receiving update reply information sent by the mobile terminal in response to the update prompt;

in response to determining that the update reply information is an update instruction, sending an update package to the electronic picture frame.

According to a second exemplary embodiment of the present disclosure, a method for controlling an electronic picture frame is provided, which comprises:

sending a request for operating the electronic picture frame to an electronic picture frame cloud platform through an Internet protocol address of the electronic picture frame;

receiving a request for acquiring account information sent by the electronic picture frame cloud platform;

sending account information of the mobile terminal;

receiving reply information sent by the electronic picture frame cloud platform after verifying whether the account information is pre-stored account information bound to the Internet protocol address of the electronic picture frame;

in response to determining that the reply information is a permission allowing the mobile terminal to operate the electronic picture frame through the Internet protocol address of the electronic picture frame, operating the electronic picture frame through the Internet protocol address of the electronic picture frame.

In some embodiments, the above-mentioned method further comprises:

in response to the electronic picture frame being used for the first time:

scanning identification information of the electronic picture frame to identify registration information of the electronic picture frame, wherein the registration information includes unique identity information of the electronic picture frame and the Internet protocol address of the electronic picture frame;

sending to the electronic picture frame cloud platform a registration request carrying registration information of the electronic picture frame and identity information of the mobile terminal receiving the account information fed back by the electronic picture frame cloud platform after successful registration of the electronic picture frame and the mobile terminal and binding of the mobile terminal to the Internet protocol address of the electronic picture frame.

In some embodiments, the above-mentioned method further comprises:

receiving a lock prompt sent by the electronic picture frame cloud platform in response to determining that the electronic picture frame has moved out of a specified area;

in response to determination of theft of the electronic picture frame according to the lock prompt, sending a lock instruction to the electronic picture frame cloud platform so that the electronic picture frame cloud platform sends a latch instruction to the electronic picture frame according to the lock instruction.

In some embodiments, the above-mentioned method further comprises:

receiving an update prompt sent by the electronic picture frame cloud platform in response to determination of a failure in the electronic picture frame;

in response to determining that the electronic picture frame needs to be updated according to the update prompt, sending an update instruction to the electronic picture frame cloud platform so that the electronic picture frame cloud platform sends an update package to the electronic picture frame according to the update instruction.

According to a third exemplary embodiment of the present disclosure, a method for controlling an electronic picture frame is further provided, which comprises:

receiving an operation instruction sent, through an Internet protocol address of the electronic picture frame, by a mobile terminal that has passed verification on the electronic picture frame cloud platform;

operating on the electronic picture frame according to the operation instruction.

In some embodiments, the above-mentioned method further comprises:

detecting and sending to the electronic picture frame cloud platform position information of the electronic picture frame at a predetermined time period;

receiving a latch instruction sent by the electronic picture frame cloud platform, wherein the latch instruction is generated by the electronic picture frame cloud platform according to a lock instruction sent by the mobile terminal in response to the lock prompt sent thereto, and the lock prompt is sent by the electronic picture frame cloud platform in response to determining that the electronic picture frame has moved out of the specified area according to the position information;

locking stored data according to the latch instruction and turning off display of data.

In some embodiments, the above-mentioned method further comprises:

periodically generating and sending to the electronic picture frame cloud platform monitoring logs of the electronic picture frame;

receiving the update package sent by the electronic picture frame cloud platform, wherein the update package is generated by the electronic picture frame cloud platform according to an update instruction sent by the mobile terminal in response to the update prompt sent thereto, and the update prompt is sent by the electronic picture frame cloud platform in response to determination of a failure in the electronic picture frame according to the monitoring logs;

upgrading firmware according to the update package.

In some embodiments, the above-mentioned method further comprises:

automatically selecting an optimal way of connection from various ways of wireless connection to the electronic picture frame cloud platform or from hotspot connections to the mobile terminal so as to communicate data with the electronic picture frame cloud platform.

According to a fourth exemplary embodiment of the present disclosure, an electronic picture frame cloud platform is provided, which comprises:

a first receiver configured to receive a request for operating an electronic picture frame sent by a mobile terminal through an Internet protocol address of the electronic picture frame;

an acquirer configured to acquire account information of the mobile terminal;

a verifier configured to verify whether the account information is pre-stored account information bound to the Internet protocol address of the electronic picture frame;

a gateway configured to send a permission to the mobile terminal to allow the mobile terminal to operate the electronic picture frame through the Internet protocol address of the electronic picture frame in response to the account information being the pre-stored account information bound to the Internet protocol address of the electronic picture frame.

In some embodiments, the above-mentioned electronic picture frame cloud platform further comprises: a first sender; wherein the first receiver is further configured to receive a registration request carrying registration information of the electronic picture frame and identity information of the mobile terminal sent by the mobile terminal after scanning identification information of the electronic picture frame, wherein the registration information includes unique identity information of the electronic picture frame and the Internet protocol address of the electronic picture frame;

the verifier is further configured to verify the identity information of the mobile terminal and, after passing the verification, bind the account information to the Internet protocol address of the electronic picture frame and store the account information and Internet protocol address;

the first sender is configured to send to the mobile terminal the account information that has been bound to the Internet protocol address of the electronic picture frame.

In some embodiments, the above-mentioned electronic picture frame cloud platform further comprises: a determinator; wherein the first receiver is further configured to receive position information sent by the electronic picture frame at a predetermined time period;

the determinator is configured to determine whether the electronic picture frame has moved out of a specified area according to the position information;

the first sender is configured to, in response to the electronic picture frame having moved out of the specified area, send a lock prompt to the mobile terminal corresponding to the account information that has been bound to the Internet protocol address of the electronic picture frame;

the first receiver is further configured to receive lock reply information sent by the mobile terminal in response to the lock prompt;

the first sender is further configured to, in response to determining that the lock reply information is a lock instruction, send a latch instruction to the electronic picture frame.

In some embodiments, said electronic picture frame cloud platform further comprises: a detector, wherein the first receiver is further configured to receive monitoring logs sent periodically by the electronic picture frame;

the detector is configured to detect whether the electronic picture frame has a failure according to the monitoring logs;

the first sender is further configured to, in response to detection of a failure in the electronic picture frame by the detector, send an update prompt to the mobile terminal corresponding to the account information that has been bound to the Internet protocol address of the electronic picture frame;

the first receiver is further configured to receive update reply information sent by the mobile terminal in response to the update prompt;

the first sender is further configured to, in response to determining that the update reply information is an update instruction, send an update package to the electronic picture frame.

According to a fifth exemplary embodiment of the present disclosure, an electronic picture frame is provided, which comprises: a wireless transceiver, a display, a memory and a controller electrically connected to the wireless transceiver, the display and the memory, respectively; wherein the wireless transceiver is configured to receive an operation instruction sent, through an Internet protocol address of the electronic picture frame, by a mobile terminal that has passed verification on an electronic picture frame cloud platform, and to communicate data with the electronic picture frame cloud platform under the control of the controller;

the controller is configured to operate according to the operation instruction;

the memory is configured to store data received by the wireless transceiver from the electronic picture frame cloud platform under the control of the controller;

the display is configured to display data stored in the memory under the control of the controller.

In some embodiments, the above-mentioned electronic picture frame further comprises: a locator electrically connected to the controller and configured to locate position information of the electronic picture frame at a predetermined time period; wherein the wireless transceiver is further configured to send the position information to the electronic picture frame cloud platform and receive the latch instruction sent from the electronic picture frame cloud platform under the control of the controller, wherein the latch instruction is generated by the electronic picture frame cloud platform according to a lock instruction sent by the mobile terminal in response to the lock prompt sent thereto, and the lock prompt is sent by the electronic picture frame cloud platform in response to determining that the electronic picture frame has moved out of the specified area according to the position information;

the controller is further configure to lock data in the memory according to the latch instruction and control the display to turn off displaying.

In some embodiments, in the above-mentioned electronic picture frame provided in the embodiment of the present disclosure, the controller is further configured to periodically generate monitoring logs of the electronic picture frame;

the wireless transceiver is further configured to send the monitoring logs to the electronic picture frame cloud platform and receive the update package sent from the electronic picture frame cloud platform under the control of the controller, wherein the update package is generated by the electronic picture frame cloud platform according to an update instruction sent by the mobile terminal in response to the update prompt sent thereto, and the update prompt is sent by the electronic picture frame cloud platform in response to determination of a failure in the electronic picture frame according to the monitoring logs;

the controller is further configured to upgrade firmware according to the update package.

In some embodiments, in the above-mentioned electronic picture frame provided in the embodiment of the present disclosure, the wireless transceiver is further configured to automatically select an optimal way of connection from various ways of wireless connection to the electronic picture frame cloud platform or from hotspot connections to the mobile terminal so as to communicate data with the electronic picture frame cloud platform.

According to a sixth exemplary embodiment of the present disclosure, a mobile terminal is provided, which comprises: a second sender, a second receiver and a processor; wherein the second sender is configured to send a request for operating the electronic picture frame to an electronic picture frame cloud platform through an Internet protocol address of the electronic picture frame;

the second receiver is configured to receive a request for acquiring account information sent by the electronic picture frame cloud platform;

the second sender is further configured to send account information of the mobile terminal in response to receiving the request for acquiring the account information;

the second receiver is further configured to receive reply information sent by the electronic picture frame cloud platform after verifying whether the account information is pre-stored account information bound to the Internet protocol address of the electronic picture frame;

the processor is configured to, in response to determining that the reply information is a permission allowing the mobile terminal to operate the electronic picture frame through the Internet protocol address of the electronic picture frame, operate the electronic picture frame through the Internet protocol address of the electronic picture frame.

According to a seventh exemplary embodiment of the present disclosure, a computer-readable storage medium is provided, which stores computer-executable instructions that, when being executed by a computer, carry out any one of the above-described methods.

According to an eighth exemplary embodiment of the present disclosure, a computing device is provided, which comprises:

a processor;

a memory storing computer-executable instructions that, when being executed by the processor, carry out any one of the above-described methods.

DETAILED DESCRIPTION OF EMBODIMENTS

With reference to the drawings, specific ways of implementation of the method for controlling the electronic picture frame and the corresponding device as provided in embodiments of the present disclosure will be described in detail below.

Figure 1:
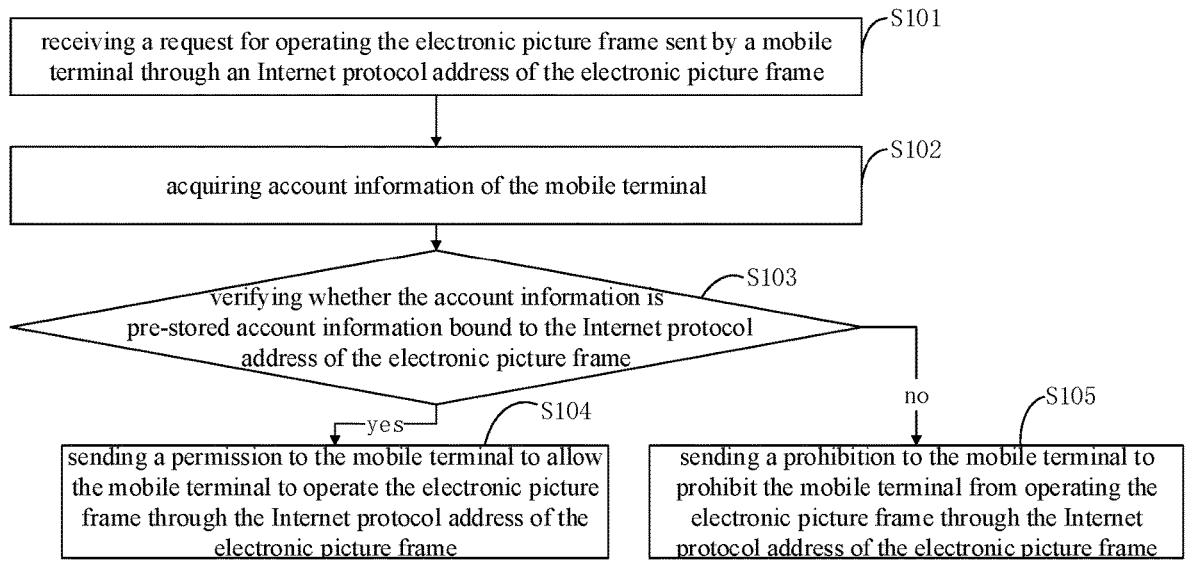
FIG. 1 is a flow chart of a method, provided in an embodiment of the present disclosure, for controlling an electronic picture frame implemented on the electronic picture frame cloud platform side.

An embodiment of the present disclosure provides a method for controlling an electronic picture frame implemented on the electronic picture frame cloud platform side. As shown in FIG. 1, the method may include the following steps:

S101: receiving a request for operating the electronic picture frame sent by a mobile terminal through an Internet protocol address of the electronic picture frame;

S102: acquiring account information of the mobile terminal;

S103: verifying whether the account information is pre-stored account information bound to the Internet protocol (IP) address of the electronic picture frame;

in response to the account information being the pre-stored account information bound to the Internet protocol (IP) address of the electronic picture frame, sending, in S104, a permission to the mobile terminal to allow the mobile terminal to operate the electronic picture frame through the Internet protocol address of the electronic picture frame.

In another embodiment, in response to the account information being not the pre-stored account information bound to the Internet protocol (IP) address of the electronic picture frame, sending, in S105, a prohibition to the mobile terminal to prohibit the mobile terminal from operating the electronic picture frame through the Internet protocol address of the electronic picture frame.

In the above-mentioned method for controlling an electronic picture frame implemented on the electronic picture frame cloud platform side as provided in the embodiment of the present disclosure, the mobile terminal is bound to the Internet protocol address of the electronic picture frame on the electronic picture frame cloud platform. When mobile terminals want to operate the electronic picture frame through the Internet protocol address of the electronic picture frame, only those mobile terminals whose identities have been authenticated can control the electronic picture frame through the Internet protocol address of the electronic picture frame, thus preventing illegal users from performing any operation on the electronic picture frame and improving safety of display of the electronic picture frame.

When other unauthenticated illegal users want to control the electronic picture frame through the mobile terminal, even if they could obtain the IP address of the electronic picture frame by scanning the identification information (e.g. QR code) of the electronic picture frame, they would be prohibited from connecting to the network through said IP address, i.e. operation of the electronic picture frame by illegal users is prohibited, thus a high display safety of the electronic picture frame is guaranteed.

In the above-mentioned method provided in the embodiment of the present disclosure, operations on the electronic picture frame performed by the mobile terminal through the Internet protocol address of the electronic picture frame include, but are not limited to, importing pictures, copying pictures, exporting pictures, playing pictures, etc.

Figure 2:
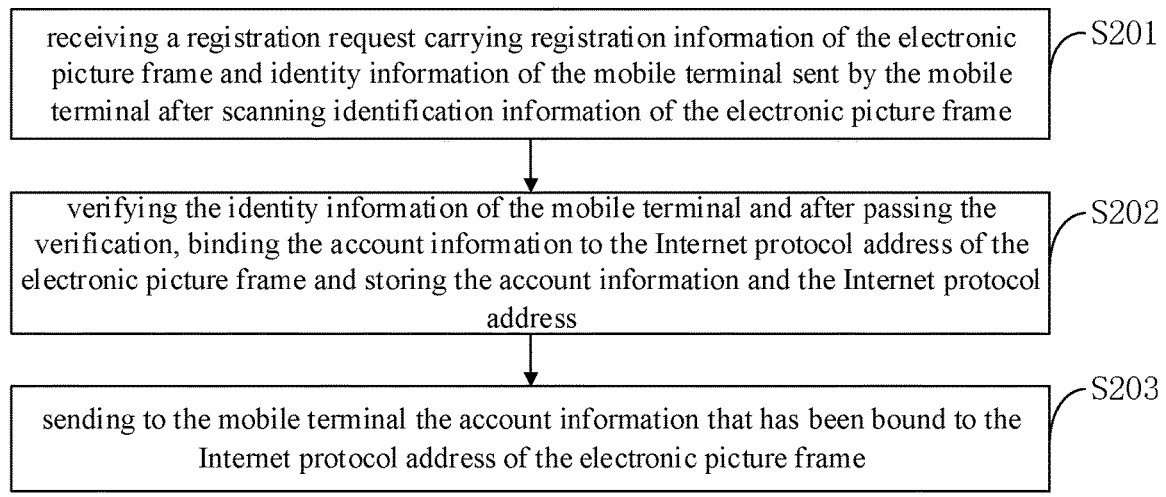
FIG. 2 is a flow chart of a method, provided in another embodiment of the present disclosure, for controlling an electronic picture frame implemented on the electronic picture frame cloud platform side.

When the electronic picture frame is used for the first time, the mobile terminal can be bound to said electronic picture frame so as to facilitate remote control in subsequent use. In view of this, the above-mentioned method provided in the embodiment of the present disclosure may further include the following steps, as shown in FIG. 2:

S201: receiving a registration request carrying registration information of the electronic picture frame and identity information of the mobile terminal sent by the mobile terminal after scanning identification information of the electronic picture frame, wherein the registration information includes unique identity information (ID) of the electronic picture frame and the Internet protocol (IP) address of the electronic picture frame;

S202: verifying the identity information of the mobile terminal and after passing the verification, binding the account information to the Internet protocol address of the electronic picture frame and storing the account information;

S203: sending to the mobile terminal the account information that has been bound to the Internet protocol address of the electronic picture frame, the account information including a username, a password, etc.

When the electronic picture frame is used for the first time, the mobile terminal can scan the identification information of the electronic picture frame to acquire the unique identity information (ID) of the electronic picture frame and the Internet protocol (IP) address of the electronic picture frame. Then, the mobile terminal communicates with the electronic picture frame cloud platform to verify and binding the identity, i.e. the account information of the mobile terminal is bound to the Internet protocol address of the electronic picture frame, such that the electronic picture frame can only be controlled through said account information, thereby effectively improving safety of use of the electronic picture frame.

Figure 3:
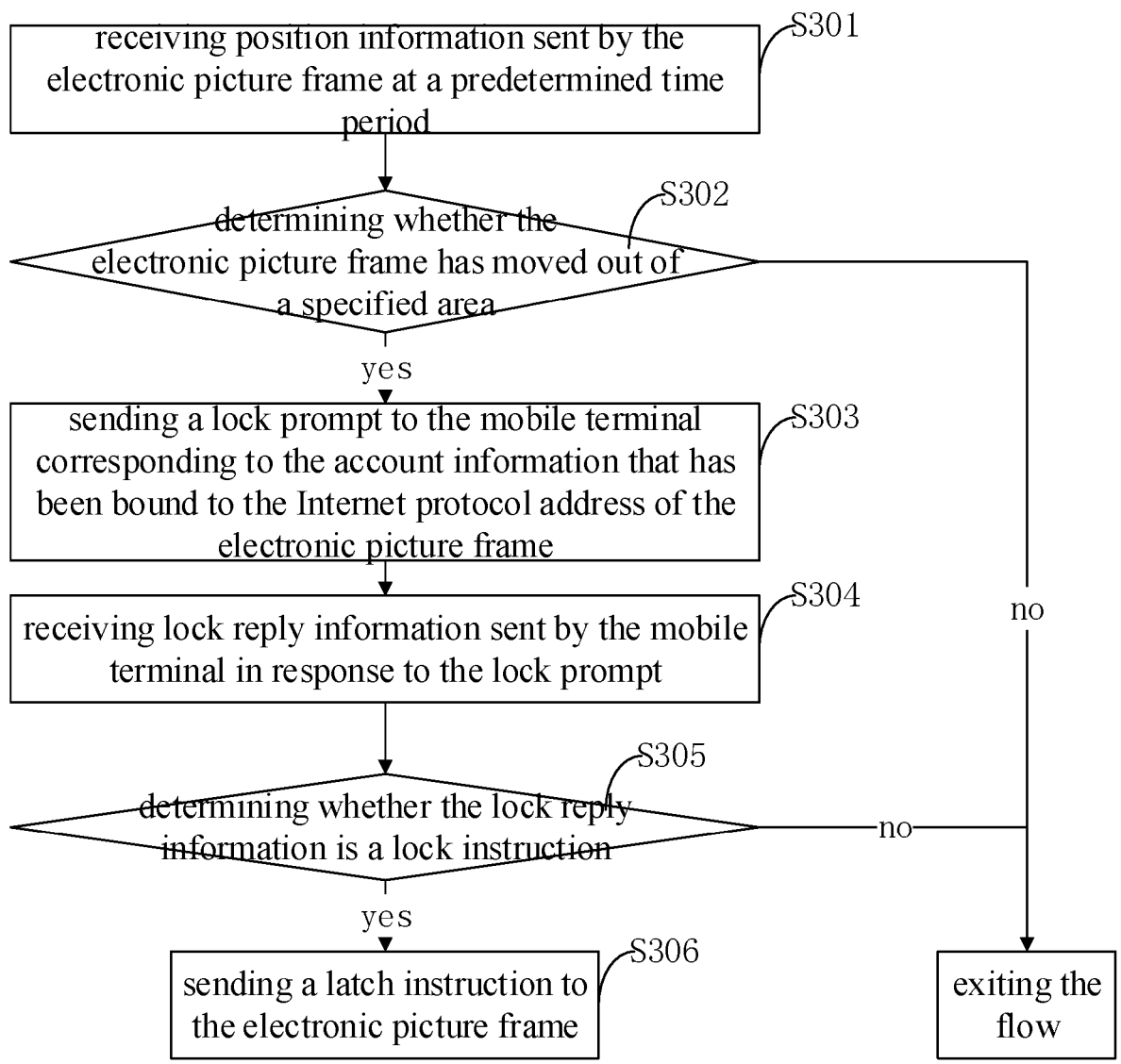
FIG. 3 is a flow chart of a method, provided in still another embodiment of the present disclosure, for controlling an electronic picture frame implemented on the electronic picture frame cloud platform side.

In order to prevent disclosure of personal or family privacy information when the electronic picture frame is lost, the above-mentioned method provided in the embodiment of the present disclosure may further include the following steps S301-S306, as shown in FIG. 3:

S301: receiving position information sent by the electronic picture frame at a predetermined time period, i.e. the electronic picture frame will report its position information at a predetermined time period;

S302: determining whether the electronic picture frame has moved out of a specified area according to the position information; and in response to determining that the electronic picture frame has moved out of the specified area, performing step S303, and in response to determining that the electronic picture frame has not moved out of the specified area, exiting the flow;

S303: sending a lock prompt to the mobile terminal corresponding to the account information that has been bound to the Internet protocol address of the electronic picture frame, i.e. informing the mobile terminal that can operate the electronic picture frame of the situation of the electronic picture frame so as to facilitate the mobile terminal to make a determination about whether the electronic picture frame has been stolen;

S304: receiving lock reply information sent by the mobile terminal in response to the lock prompt;

S305: determining whether the lock reply information is a lock instruction; and in response to determining that the lock reply information is the lock instruction, performing step S306, and in response to determining that the lock reply information is the ignoring information, exiting the flow;

S306: sending a latch instruction to the electronic picture frame so that the electronic picture frame can lock the stored data and turn off the display according to the latch instruction, thus ensuring that the electronic picture frame loses the display function and preventing exporting of the picture data from the electronic picture frame when the electronic picture frame is lost, as a result, safety of pictures stored in the electronic picture frame can be guaranteed.

Figure 4:
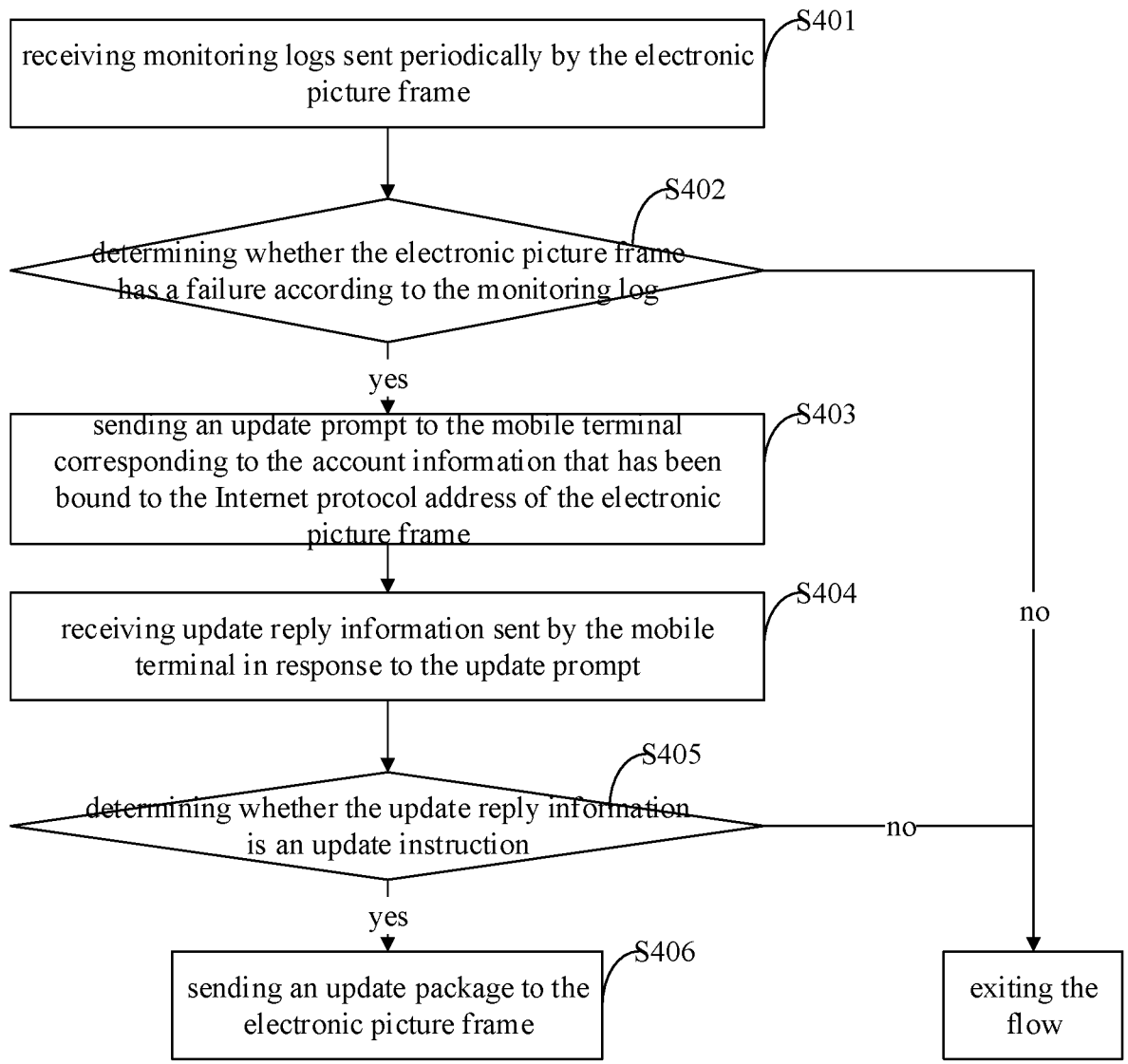
FIG. 4 is a flow chart of a method, provided in yet another embodiment of the present disclosure, for controlling an electronic picture frame implemented on the electronic picture frame cloud platform side.

In some embodiments, the above-mentioned method provided in the embodiment of the present disclosure may further include the following steps, as shown in FIG. 4:

S401: receiving monitoring logs sent periodically by the electronic picture frame, i.e. the electronic picture frame will periodically report monitoring logs;

S402: determining whether the electronic picture frame has a failure according to the monitoring log; if yes, performing step S403; if no, exiting the flow;

S403: sending an update prompt to the mobile terminal corresponding to the account information that has been bound to the Internet protocol address of the electronic picture frame;

S404: receiving update reply information sent by the mobile terminal in response to the update prompt;

S405: determining whether the update reply information is an update instruction; and in response to determining that the update reply information is an update instruction, performing step S406, and in response to determining that the update reply information is an ignoring information, exiting the flow;

S406: sending an update package to the electronic picture frame to enable the electronic picture frame to upgrade the firmware according to the update package so as to eliminate the failure. Thus the electronic picture frame can be used much more easily, the popularity and utilization rate of the electronic picture frame can be increased and the cost can be reduced.

Figure 5:
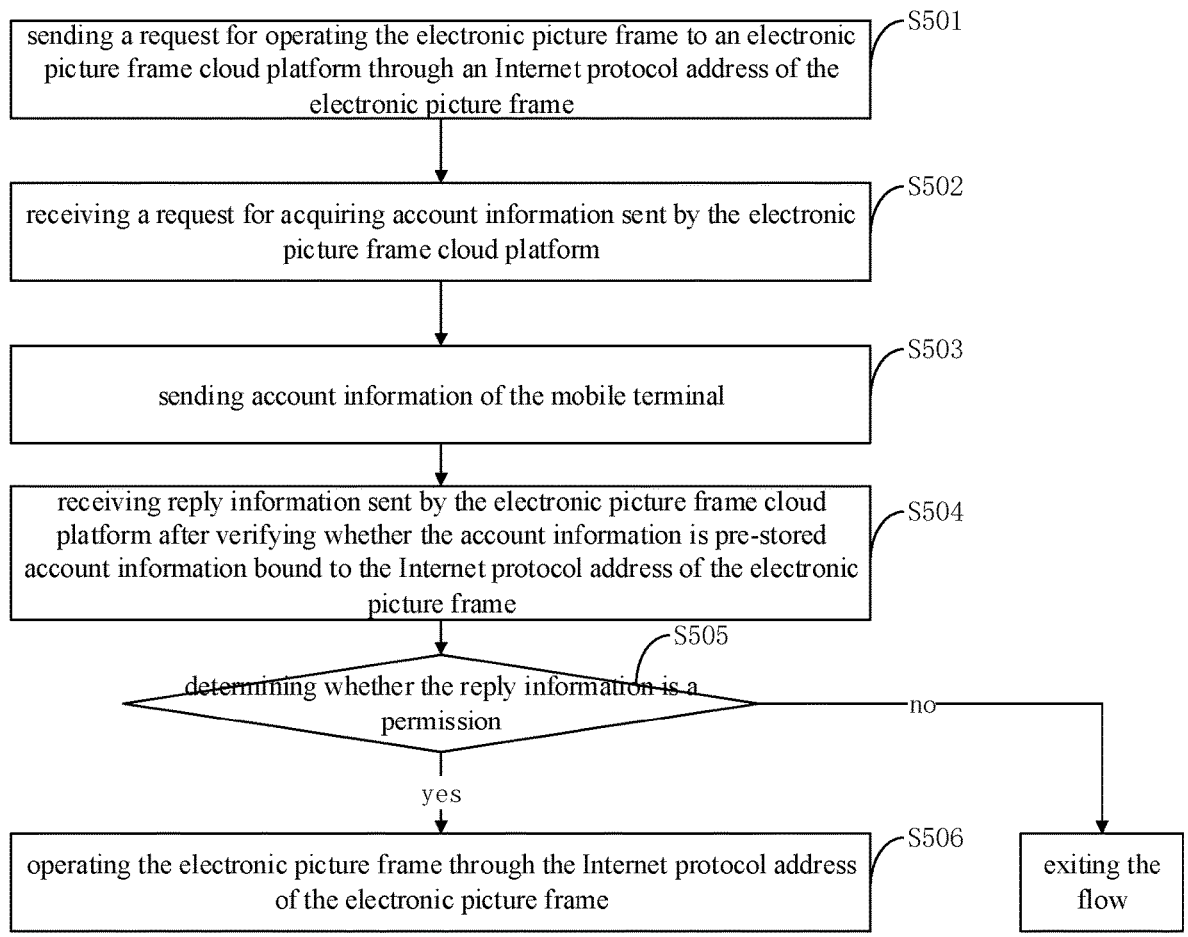
FIG. 5 is a flow chart of a method, provided in an embodiment of the present disclosure, for controlling an electronic picture frame implemented on the mobile terminal side.

An embodiment of the present disclosure further provides a method for controlling an electronic picture frame implemented on the mobile terminal side. As shown in FIG. 5, the method may include the following steps:

S501: sending a request for operating the electronic picture frame to an electronic picture frame cloud platform through an Internet protocol address of the electronic picture frame;

S502: receiving a request for acquiring account information sent by the electronic picture frame cloud platform;

S503: sending account information of the mobile terminal in response to receiving the request;

S504: receiving reply information sent by the electronic picture frame cloud platform after verifying whether the account information is pre-stored account information bound to the Internet protocol address of the electronic picture frame;

S505: determining whether the reply information is a permission; and in response to determining that the reply information is the permission, performing step S506, and in response to determining that the reply information is a prohibition, exiting the flow; S506: operating the electronic picture frame through the Internet protocol address of the electronic picture frame.

In the above-mentioned method for controlling an electronic picture frame implemented on the mobile terminal side as provided in the embodiment of the present disclosure, by means of binding the mobile terminal to the Internet protocol address of the electronic picture frame on the electronic picture frame cloud platform, when mobile terminals send requests for operating the electronic picture frame to the electronic picture frame cloud platform through the Internet protocol address of the electronic picture frame, only those mobile terminals whose identities have been authenticated can control the electronic picture frame through the Internet protocol address of the electronic picture frame, thus preventing illegal users from performing any operation on the electronic picture frame and improving safety of display of the electronic picture frame.

When other unauthenticated illegal users want to control the electronic picture frame through the mobile terminal, even if they could obtain the IP address of the electronic picture frame by scanning the identification information of the electronic picture frame, they would be prohibited from connecting to the network through said IP address, i.e. operation of the electronic picture frame by illegal users is prohibited, thus a high display safety of the electronic picture frame is guaranteed.

In the method for controlling an electronic picture frame implemented on the mobile terminal side as provided in the embodiment of the present disclosure, operations on the electronic picture frame performed by the mobile terminal through the Internet protocol address of the electronic picture frame include, but are not limited to, importing pictures, copying pictures, exporting pictures, playing pictures, etc.

Figure 6:
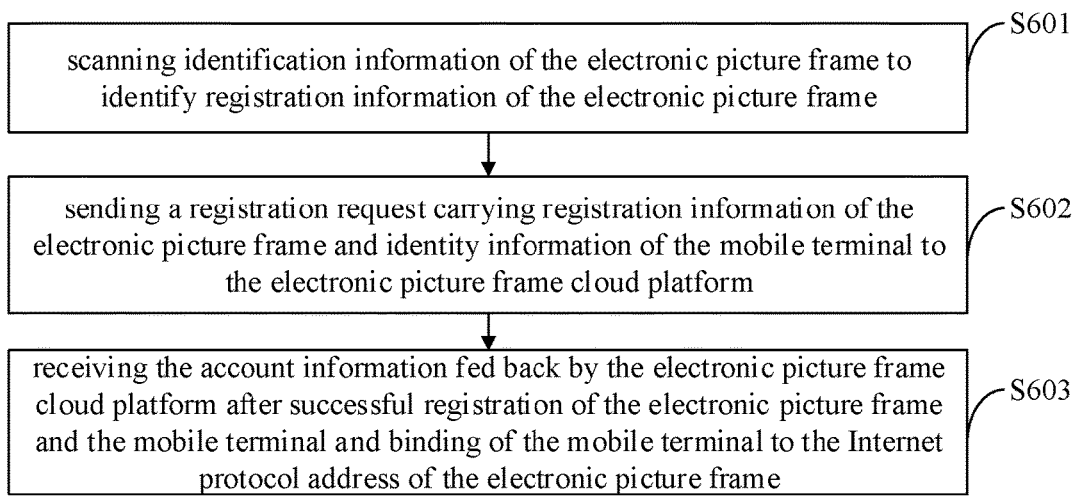
FIG. 6 is a flow chart of a method, provided in another embodiment of the present disclosure, for controlling an electronic picture frame implemented on the mobile terminal side.

In the method for controlling an electronic picture frame implemented on the mobile terminal side as provided in the embodiment of the present disclosure, when the electronic picture frame is used for the first time, the mobile terminal can be bound to said electronic picture frame so as to facilitate remote control of the electronic picture frame in subsequent use. In view of this, as shown in FIG. 6, the method for controlling an electronic picture frame implemented on the mobile terminal side as provided in the embodiment of the present disclosure may further include the following steps:

S601: scanning identification information of the electronic picture frame to identify registration information of the electronic picture frame, the registration information including unique identity information of the electronic picture frame and the Internet protocol address of the electronic picture frame;

S602: sending a registration request carrying registration information of the electronic picture frame and identity information of the mobile terminal to the electronic picture frame cloud platform;

S603: receiving the account information fed back by the electronic picture frame cloud platform after successful registration of the electronic picture frame and the mobile terminal and binding of the mobile terminal to the Internet protocol address of the electronic picture frame, so that said account information is used for controlling the electronic picture frame.

When the electronic picture frame is used for the first time, the mobile terminal can scan the identification information of the electronic picture frame to acquire the unique identity information (ID) of the electronic picture frame and the Internet protocol (IP) address of the electronic picture frame. Then, identity verification and identity binding can be performed between the mobile terminal and the electronic picture frame cloud platform, i.e. the account information of the mobile terminal is bound to the Internet protocol address of the electronic picture frame, such that the electronic picture frame can only be controlled through said account information, thereby effectively improving safety of use of the electronic picture frame.

Figure 7:
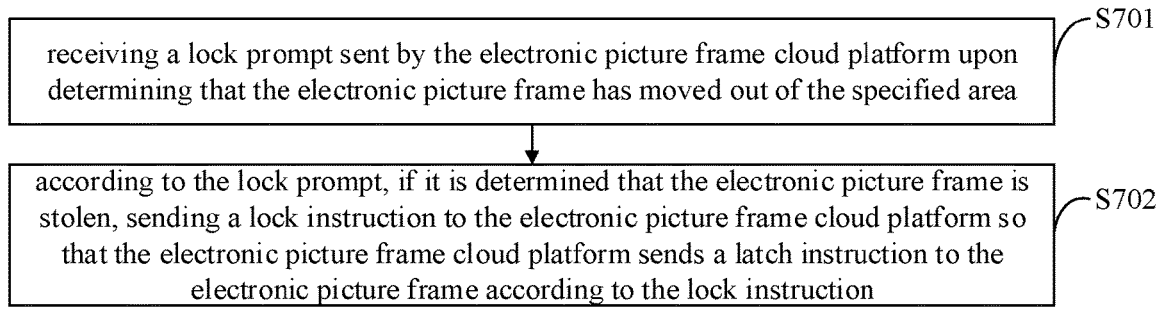
FIG. 7 is a flow chart of a method, provided in still another embodiment of the present disclosure, for controlling an electronic picture frame implemented on the mobile terminal side.

As shown in FIG. 7, the method for controlling an electronic picture frame implemented on the mobile terminal side as provided in the embodiment of the present disclosure may further include the following steps:

S701: receiving a lock prompt sent by the electronic picture frame cloud platform upon determining that the electronic picture frame has moved out of the specified area;

S702: according to the lock prompt, if it is determined that the electronic picture frame is stolen, sending a lock instruction to the electronic picture frame cloud platform so that the electronic picture frame cloud platform sends a latch instruction to the electronic picture frame according to the lock instruction. Thus it can be ensured that the electronic picture frame loses the display function and that the picture data cannot be exported from the electronic picture frame when the electronic picture frame is lost, as a result, safety of pictures stored in the electronic picture frame can be guaranteed.

Figure 8:
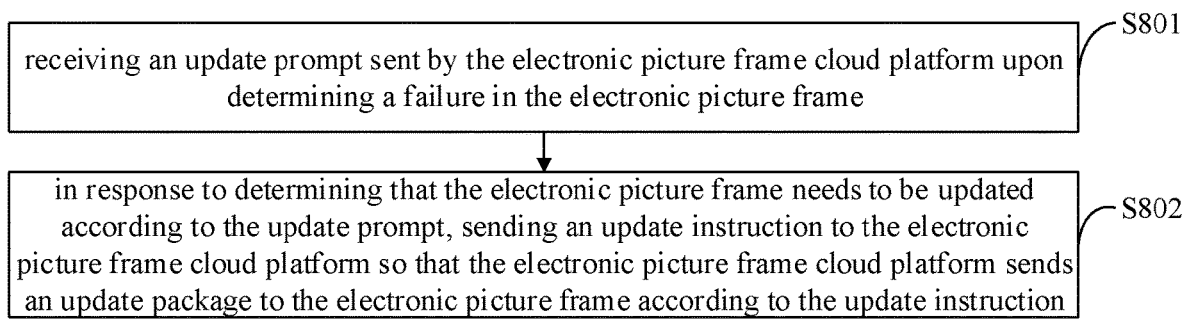
FIG. 8 is a flow chart of a method, provided in yet another embodiment of the present disclosure, for controlling an electronic picture frame implemented on the mobile terminal side.

As shown in FIG. 8, the method for controlling an electronic picture frame implemented on the mobile terminal side as provided in the embodiment of the present disclosure may further include the following steps:

S801: receiving an update prompt sent by the electronic picture frame cloud platform upon determining a failure in the electronic picture frame;

S802: in response to determining that the electronic picture frame needs to be updated according to the update prompt, sending an update instruction to the electronic picture frame cloud platform so that the electronic picture frame cloud platform sends an update package to the electronic picture frame according to the update instruction. The electronic picture frame will upgrade the firmware according to the update package so as to eliminate the failure, thus the electronic picture frame can be used much more easily, the popularity and utilization rate of the electronic picture frame can be increased and the cost can be reduced.

Figure 9:
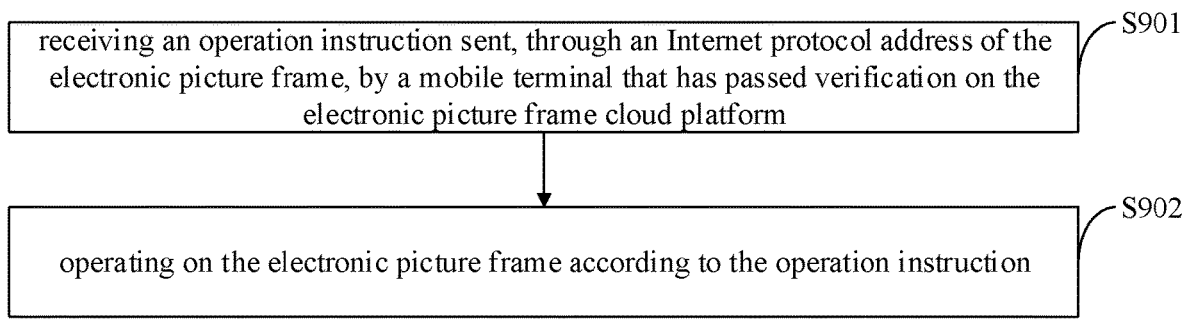
FIG. 9 is a flow chart of a method, provided in an embodiment of the present disclosure, for controlling an electronic picture frame implemented on the electronic picture frame side.

An embodiment of the present disclosure further provides a method for controlling an electronic picture frame implemented on the electronic picture frame side. As shown in FIG. 9, the method for controlling an electronic picture frame implemented on the electronic picture frame side may include the following steps:

S901: receiving an operation instruction sent, through an Internet protocol address of the electronic picture frame, by a mobile terminal that has passed verification on the electronic picture frame cloud platform;

S902: operating on the electronic picture frame according to the operation instruction.

In the above-mentioned method for controlling an electronic picture frame implemented on the electronic picture frame side as provided in the embodiment of the present disclosure, when the mobile terminal sends the request for operating the electronic picture frame to the electronic picture frame cloud platform through the Internet protocol address of the electronic picture frame, the mobile terminal is bound to the Internet protocol address of the electronic picture frame on the electronic picture frame cloud platform, this ensures that only those mobile terminals whose identities have been authenticated can control the electronic picture frame through the Internet protocol address of the electronic picture frame, and illegal users can be prevented from performing any operation on the electronic picture frame, as a result, safety of display of the electronic picture frame is improved.

When other unauthenticated illegal users want to control the electronic picture frame, even if they could obtain the IP address of the electronic picture frame by scanning the identification information of the electronic picture frame, they would be prohibited from connecting to the network through said IP address, i.e. operation of the electronic picture frame by illegal users is prohibited. Thus a high display safety of the electronic picture frame is guaranteed.

In the method for controlling an electronic picture frame implemented on the electronic picture frame side as provided in the embodiment of the present disclosure, operations on the electronic picture frame performed by the mobile terminal through the Internet protocol address of the electronic picture frame include, but are not limited to, importing pictures, copying pictures, exporting pictures, playing pictures, etc.

Figure 10:
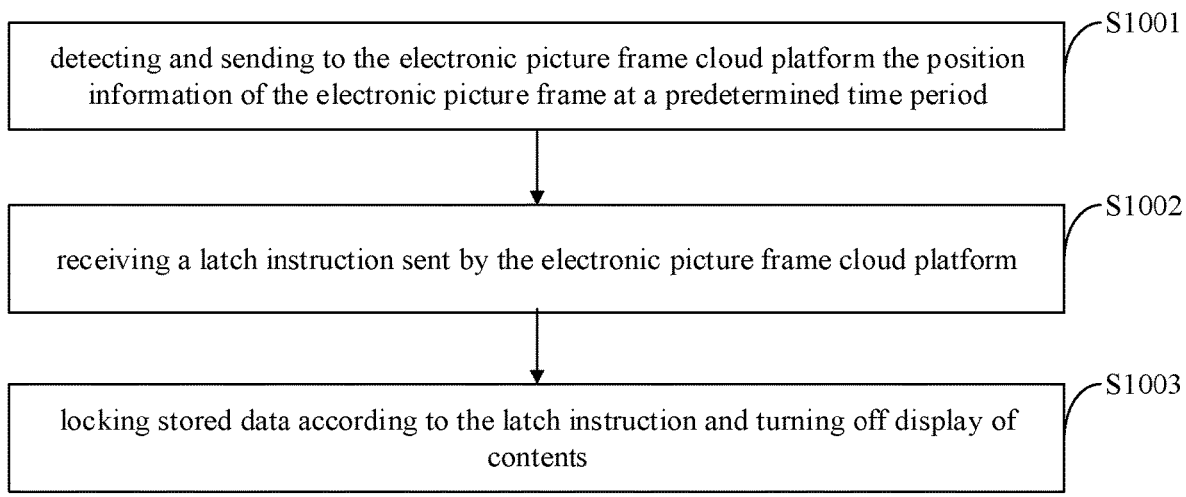
FIG. 10 is a flow chart of a method, provided in another embodiment of the present disclosure, for controlling an electronic picture frame implemented on the electronic picture frame side.

In order to prevent disclosure of personal or family privacy information when the electronic picture frame is lost, as shown in FIG. 10, the method for controlling an electronic picture frame implemented on the electronic picture frame side as provided in the embodiment of the present disclosure may further include the following steps:

S1001: detecting and sending to the electronic picture frame cloud platform the position information of the electronic picture frame at a predetermined time period;

S1002: receiving a latch instruction sent by the electronic picture frame cloud platform, wherein the latch instruction is generated by the electronic picture frame cloud platform according to a lock instruction sent by the mobile terminal in response to the lock prompt sent thereto, and the lock prompt is sent by the electronic picture frame cloud platform in response to determining that the electronic picture frame has moved out of the specified area;

S1003: locking stored data according to the latch instruction and turning off display of contents. This ensures that the electronic picture frame loses the display function and preventing exporting of the picture data from the electronic picture frame when the electronic picture frame is lost, as a result, safety of pictures stored in the electronic picture frame can be guaranteed.

Figure 11:
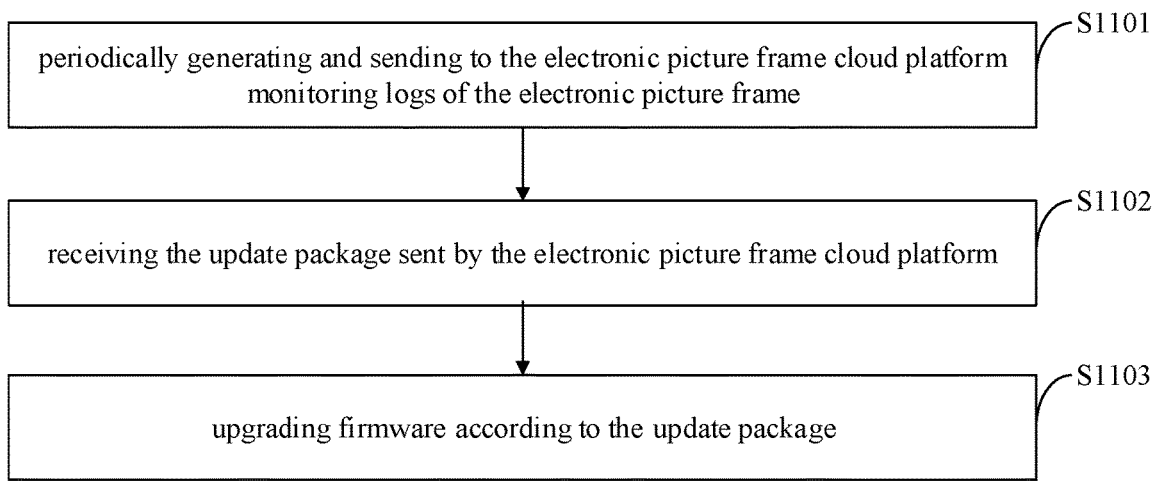
FIG. 11 is a flow chart of a method, provided in still another embodiment of the present disclosure, for controlling an electronic picture frame implemented on the electronic picture frame side.

In some other embodiments, as shown in FIG. 11, the method for controlling an electronic picture frame implemented on the electronic picture frame side as provided in the embodiment of the present disclosure may further comprise the following steps:

S1101: periodically generating and sending to the electronic picture frame cloud platform monitoring logs of the electronic picture frame;

S1102: receiving the update package sent by the electronic picture frame cloud platform, wherein the update package is generated by the electronic picture frame cloud platform according to an update instruction sent by the mobile terminal in response to the update prompt sent thereto, and the update prompt is sent by the electronic picture frame cloud platform in response to determination of a failure in the electronic picture frame;

S1103: upgrading firmware according to the update package so as to eliminate the failure. In this manner, the electronic picture frame can be used much more easily, the popularity and utilization rate of the electronic picture frame can be increased and the cost can be reduced.

In some embodiments, during data transmission between the electronic picture frame and the electronic picture frame cloud platform, an optimal way of connection is automatically selected from various ways of wireless connection to the electronic picture frame cloud platform or from hotspot connections to the mobile terminal. Specifically, the electronic picture frame may include various ways of wireless connection such as ZigBee unit, WiFi unit, Lifi unit, WLAN interface, etc., and it can enable switching among said various ways of wireless connection while transmitting data to the electronic picture frame cloud platform, thus the data transmission effect will not be influenced even if the network connection is subject to interference.

Based on the same inventive concept, an embodiment of the present disclosure further provides an electronic picture frame cloud platform, a mobile terminal and an electronic picture frame. Principles of said electronic picture frame cloud platform, mobile terminal and electronic picture frame are similar to that of the above-described method for controlling an electronic picture frame, so as for implementations of said electronic picture frame cloud platform, mobile terminal and electronic picture frame, reference can be made to the implementation of the method for controlling an electronic picture frame.

Figure 12:
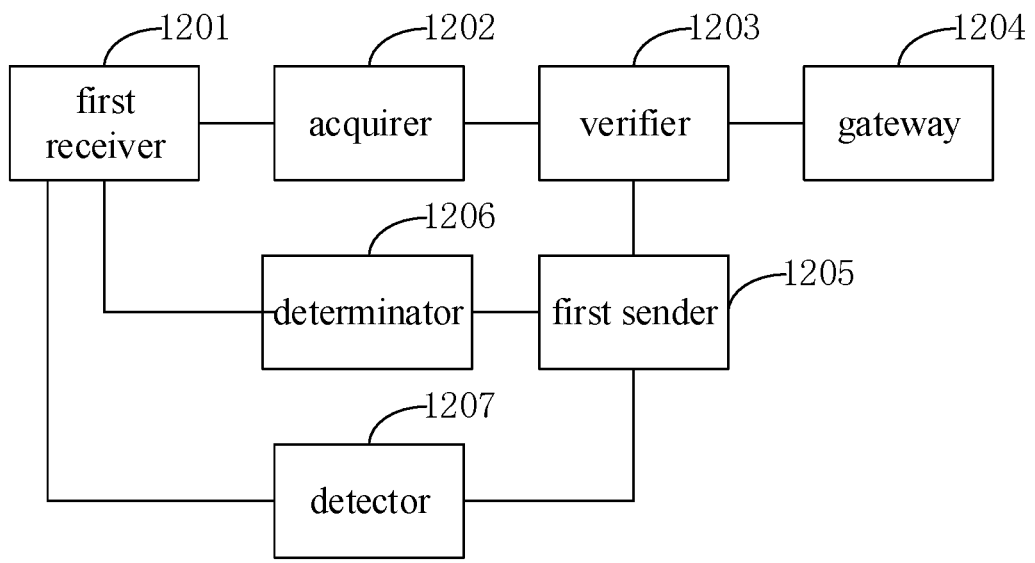
FIG. 12 is a structural diagram of an electronic picture frame cloud platform provided in an embodiment of the present disclosure.

As shown in FIG. 12, an electronic picture frame cloud platform provided in an embodiment of the present disclosure may comprise:

a first receiver 1201 configured to receive a request for operating the electronic picture frame sent by a mobile terminal through an Internet protocol address of the electronic picture frame;

an acquirer 1202 configured to acquire account information of the mobile terminal;

a verifier 1203 configured to verify whether the account information is pre-stored account information bound to the Internet protocol address of the electronic picture frame;

a gateway 1204 configured to send a permission to the mobile terminal to allow the mobile terminal to operate the electronic picture frame through the Internet protocol address of the electronic picture frame in response to the account information being the pre-stored account information bound to the Internet protocol address of the electronic picture frame; and send a prohibition to the mobile terminal to prohibit the mobile terminal from operating the electronic picture frame through the Internet protocol address of the electronic picture frame in response to the account information being not the pre-stored account information bound to the Internet protocol address of the electronic picture frame.

It shall be noted that the acquirer can send a request to the mobile terminal for acquiring the account information of the mobile terminal, then it can acquire the account information of the mobile terminal. The acquirer may, for example, be a communication module (e.g. 4G or WIFI communication module) capable of data transmission or communication, or it may be an integrated circuit like a wireless transceiver.

In some embodiments, as shown in FIG. 12, the above-mentioned electronic picture frame cloud platform provided in an embodiment of the present disclosure may further comprise: a first sender 1205, and wherein the first receiver 1201 is further configured to receive a registration request carrying registration information of the electronic picture frame and identity information of the mobile terminal sent by the mobile terminal after scanning identification information of the electronic picture frame, wherein the registration information includes unique identity information of the electronic picture frame and the Internet protocol address of the electronic picture frame;

the verifier 1203 is further configured to verify the identity information of the mobile terminal and, after passing the verification, bind the account information to the Internet protocol address of the electronic picture frame and store the account information and the Internet protocol address;

the first sender 1205 is configured to send to the mobile terminal the account information that has been bound to the Internet protocol address of the electronic picture frame.

In some embodiments, as shown in FIG. 12, the above-mentioned electronic picture frame cloud platform as provided in an embodiment of the present disclosure may further comprise: a determinator 1206; wherein the first receiver 1201 is further configured to receive position information sent by the electronic picture frame at a predetermined time period;

the determinator 1206 is configured to determine whether the electronic picture frame has moved out of a specified area;

the first sender 1205 is configured to, in response to the determinator 1206 determining that electronic picture frame has moved out of the specified area, send a lock prompt to the mobile terminal corresponding to the account information that has been bound to the Internet protocol address of the electronic picture frame;

the first receiver 1201 is further configured to receive lock reply information sent by the mobile terminal in response to the lock prompt;

the first sender 1205 is further configured to send a latch instruction to the electronic picture frame upon determining that the lock reply information is a lock instruction.

It shall be noted that the determinator can be any means capable of data processing, such as a processor, a programmable gate array, etc.

In some embodiments, as shown in FIG. 12, the above-mentioned electronic picture frame cloud platform as provided in an embodiment of the present disclosure may further comprise: a detector 1207; wherein the first receiver 1201 is further configured to receive monitoring logs sent periodically by the electronic picture frame;

the detector 1207 is configured to detect whether the electronic picture frame has a failure according to the monitoring logs;

the first sender 1205 is further configured to, in response to detection of a failure in the electronic picture frame by the detector, send an update prompt to the mobile terminal corresponding to the account information that has been bound to the Internet protocol address of the electronic picture frame;

the first receiver 1201 is further configured to receive update reply information sent by the mobile terminal in response to the update prompt;

the first sender 1205 is further configured to, in response to determining that the update reply information is an update instruction, send an update package to the electronic picture frame.

Figure 13:
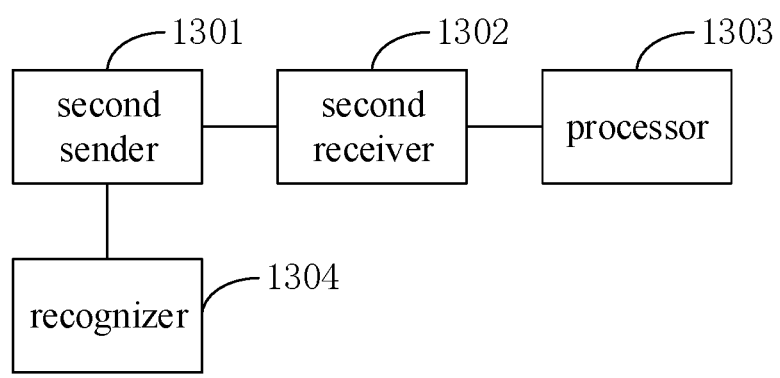
FIG. 13 is a structural diagram of a mobile terminal provided in an embodiment of the present disclosure.

An embodiment of the present disclosure further provides a mobile terminal, which, as shown in FIG. 13, comprise a second sender 1301, a second receiver 1302 and a processor 1303; wherein the second sender 1301 is configured to send a request for operating the electronic picture frame to an electronic picture frame cloud platform through an Internet protocol address of the electronic picture frame;

the second receiver 1302 is configured to receive a request for acquiring account information sent by the electronic picture frame cloud platform;

the second sender 1301 is further configured to send account information of the mobile terminal in response to receiving the request for acquiring the account information;

the second receiver 1302 is further configured to receive reply information sent by the electronic picture frame cloud platform after verifying whether the account information is pre-stored account information bound to the Internet protocol address of the electronic picture frame;

the processor 1303 is configured to operate the electronic picture frame through the Internet protocol address of the electronic picture frame upon determining that the replay information is a permission.

In some embodiments, as shown in FIG. 13, the above-mentioned mobile terminal provided in an embodiment of the present disclosure may further comprise: a recognizer 1304 configured to scan identification information of the electronic picture frame and identify registration information of the electronic picture frame, the registration information including unique identity information of the electronic picture frame and the Internet protocol address of the electronic picture frame; wherein the second sender 1301 is further configured to send a registration request carrying registration information of the electronic picture frame and identity information of the mobile terminal to the electronic picture frame cloud platform;

the second receiver 1302 is further configured to receive the account information fed back by the electronic picture frame cloud platform after successful registration of the electronic picture frame and the mobile terminal and binding of the mobile terminal to the Internet protocol address of the electronic picture frame.

In some embodiments, the second receiver 1302 is further configured to receive a lock prompt sent by the electronic picture frame cloud platform in response to determining that the electronic picture frame has moved out of a specified area; the second sender 1301 is further configured to send a lock instruction to the electronic picture frame cloud platform while determining theft of the electronic picture frame according to the lock prompt, so that the electronic picture frame cloud platform sends a latch instruction to the electronic picture frame according to the lock instruction.

In some embodiments, the second receiver 1302 is further configured to receive an update prompt sent by the electronic picture frame cloud platform in response to determination of a failure in the electronic picture frame; and the second sender 1301 is further configured to send an update instruction to the electronic picture frame cloud platform while determining that the electronic picture frame needs to be updated according to the update prompt, so that the electronic picture frame cloud platform sends an update package to the electronic picture frame according to the update instruction.

Figure 14:
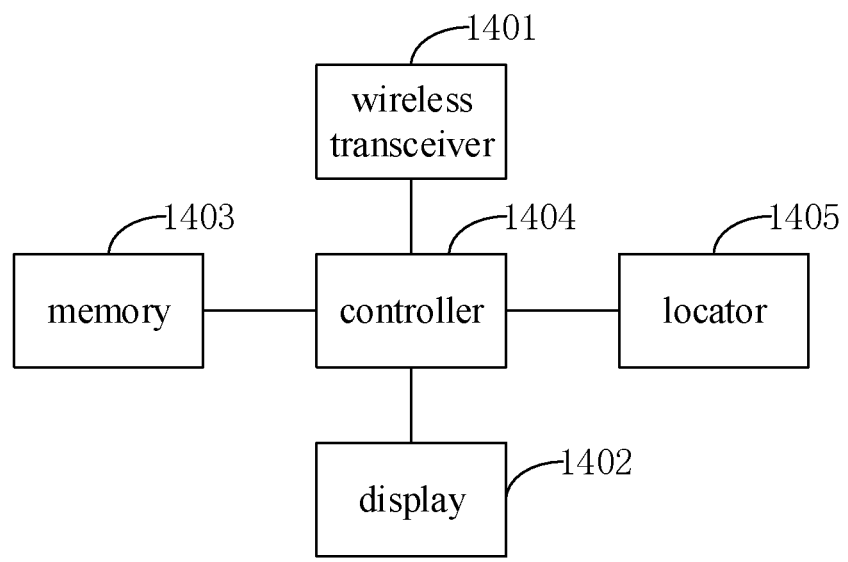
FIG. 14 is a structural diagram of an electronic picture frame provided in an embodiment of the present disclosure.

An embodiment of the present disclosure further provides an electronic picture frame, which, as shown in FIG. 14, can comprise: a wireless transceiver 1401, a display 1402, a memory 1403 and a controller 1404; wherein the controller 1404 is electrically connected to the wireless transceiver 1401, the display 1402 and the memory 1403, respectively.

The wireless transceiver 1401 is configured to receive an operation instruction sent, through an Internet protocol address of the electronic picture frame, by a mobile terminal that has passed verification on the electronic picture frame cloud platform, and to communicate data with the electronic picture frame cloud platform under the control of the controller 1404.

The controller 1404 is configured to operate according to the operation instruction.

The memory 1403 is configured to store data received by the wireless transceiver from the electronic picture frame cloud platform under the control of the controller 1404;

The display 1402 is configured to display data stored in the memory under the control of the controller 1404.

In the above-mentioned electronic picture frame provided in an embodiment of the present disclosure, the display 1402 can be a common component having a display function used on display panels, electronic paper, mobile phones, tablet PCs, TVs, laptops, navigators, etc.

As shown in FIG. 14, the above-mentioned electronic picture frame provided in an embodiment of the present disclosure may further comprise: a locator 1405 electrically connected to the controller 1404, which is configured to locate position information of the electronic picture frame at a predetermined time period; wherein the wireless transceiver 1401 is further configured to send position information to the electronic picture frame cloud platform and receive the latch instruction sent from the electronic picture frame cloud platform under the control of the controller 1404, wherein the latch instruction is generated by the electronic picture frame cloud platform according to a lock instruction sent by the mobile terminal in response to the lock prompt sent thereto, and the lock prompt is sent by the electronic picture frame cloud platform in response to determining that the electronic picture frame has moved out of the specified area;

the controller 1404 is further configure to lock data in the memory 1403 according to the latch instruction and control the display 1402 to turn off displaying.

In some embodiments, the controller 1404 is further configured to periodically generate monitoring logs of the electronic picture frame;

the wireless transceiver 1404 is further configured to send the monitoring logs to the electronic picture frame cloud platform under the control of the controller 1404; and receive the update package sent from the electronic picture frame cloud platform, wherein the update package is generated by the electronic picture frame cloud platform according to an update instruction sent by the mobile terminal in response to the update prompt sent thereto, and the update prompt is sent by the electronic picture frame cloud platform in response to determination of a failure in the electronic picture frame;

the controller 1404 is further configured to upgrade firmware according to the update package.

In the above-mentioned electronic picture frame provided in an embodiment of the present disclosure, the wireless transceiver 1401 is further configured to automatically select an optimal way of connection from various ways of wireless connection to the electronic picture frame cloud platform or from hotspot connections to the mobile terminal while communicating data with the electronic picture frame cloud platform, thus the data transmission effect will not be influenced even if the network connection is subject to interference.

Signaling interaction among the above-mentioned electronic picture frame, mobile terminal and electronic picture frame cloud platform as provided in embodiments of the present disclosure will be illustrated by specific embodiments below, which enables the functions of safe display, anti-theft and firmware upgrading of the electronic picture frame.

Figure 15:
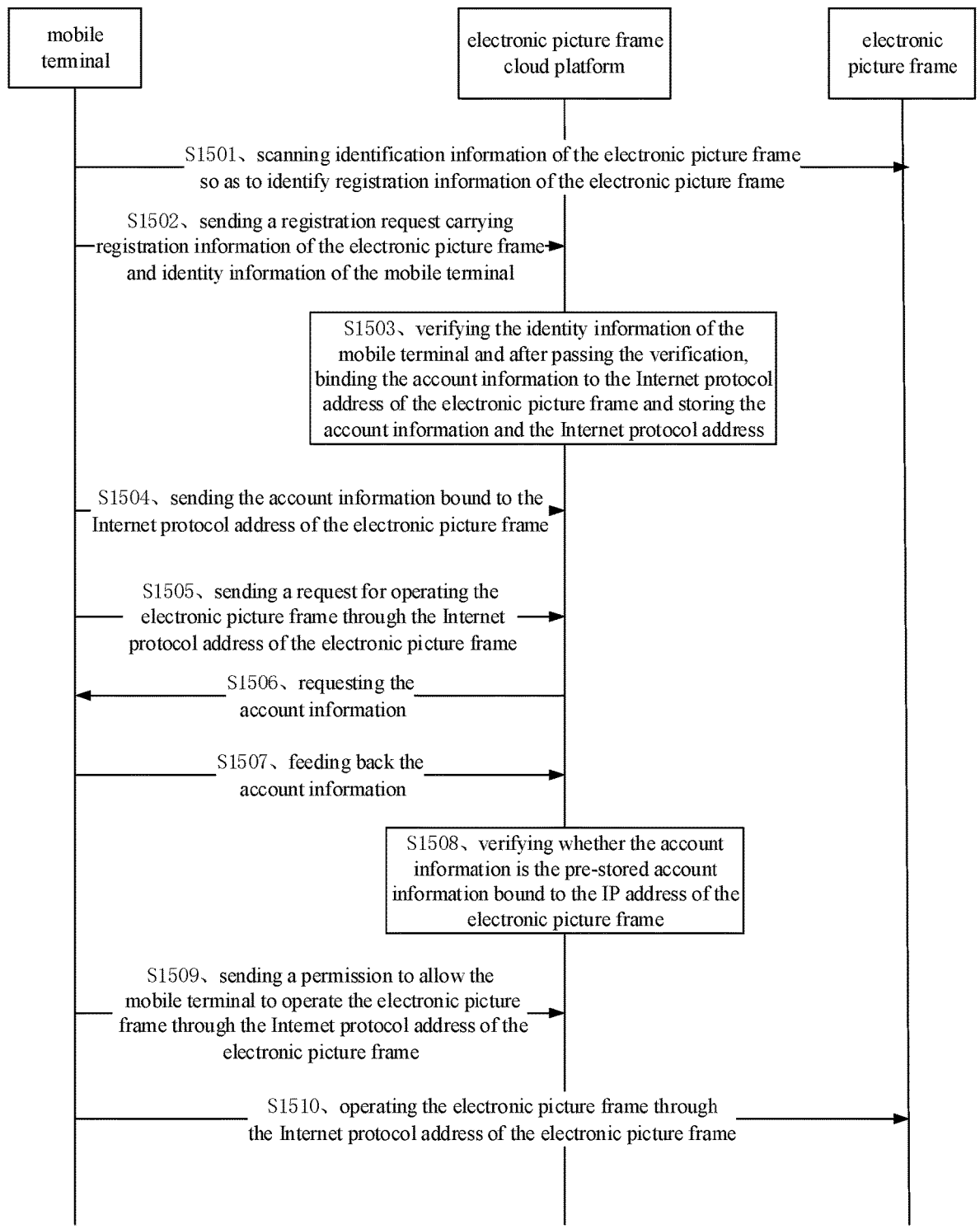
FIG. 15 is a diagram of an exemplary signaling interaction according to an embodiment of the present disclosure.

FIG. 15 is a diagram of an exemplary signaling interaction according to an embodiment of the present disclosure, which enables the safe control process of the electronic picture frame. As shown in FIG. 15, the signaling interaction includes the following procedure:

S1501: scanning identification information of the electronic picture frame by the mobile terminal so as to identify registration information of the electronic picture frame;

S1502: sending, by the mobile terminal, a registration request carrying registration information of the electronic picture frame and identity information of the mobile terminal to the electronic picture frame cloud platform;

S1503: verifying the identity information of the mobile terminal by the electronic picture frame cloud platform, and after passing the verification, binding an account information to the Internet protocol address of the electronic picture frame and storing the account information and the Internet protocol address;

S1504: sending, by the electronic picture frame cloud platform, the account information bound to the Internet protocol address of the electronic picture frame to the mobile terminal;

S1505: sending, by the mobile terminal, a request for operating the electronic picture frame to the electronic picture frame cloud platform through the Internet protocol address of the electronic picture frame;

S1506: requesting the account information from mobile terminal by the electronic picture frame cloud platform;

S1507: feeding back the account information to the electronic picture frame cloud platform by the mobile terminal;

S1508: verifying, by the electronic picture frame cloud platform, whether the account information is the pre-stored account information bound to the Internet protocol (IP) address of the electronic picture frame;

S1509: sending, by the electronic picture frame cloud platform, a permission to the mobile terminal to allow the mobile terminal to operate the electronic picture frame through the Internet protocol address of the electronic picture frame;

S1510: operating the electronic picture frame by the mobile terminal through the Internet protocol address of the electronic picture frame.

Figure 16:
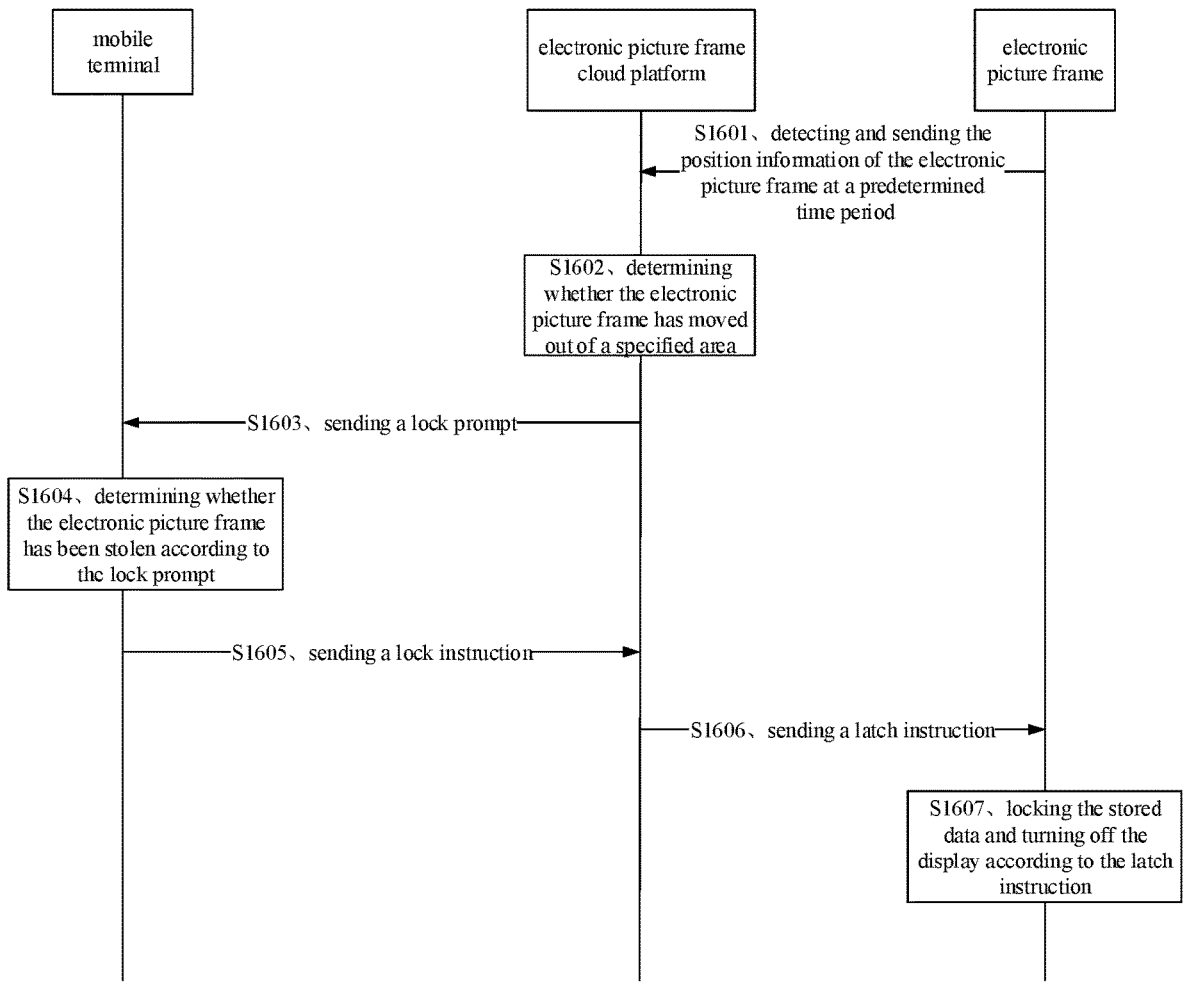
FIG. 16 is a diagram of an exemplary signaling interaction according to another embodiment of the present disclosure.

FIG. 16 is a diagram of an exemplary signaling interaction according to another embodiment of the present disclosure, which enables anti-theft detection of the electronic picture frame. As shown in FIG. 16, the signaling interaction includes the following procedure:

S1601: detecting and sending to the electronic picture frame cloud platform the position information of the electronic picture frame by the electronic picture frame at a predetermined time period;

S1602: determining, by the electronic picture frame cloud platform, whether the electronic picture frame has moved out of a specified area;

S1603: sending, by the electronic picture frame cloud platform, a lock prompt to the mobile terminal corresponding to the account information bound to the Internet protocol address of the electronic picture frame;

S1604: determining, by the mobile terminal, whether the electronic picture frame has been stolen according to the lock prompt;

S1605: sending a lock instruction to the electronic picture frame cloud platform by the mobile terminal in response to determining that the electronic picture frame has been stolen;

S1606: sending a latch instruction to the electronic picture frame by the electronic picture frame cloud platform;

S1607: locking the stored data and turning off the display by the electronic picture frame according to the latch instruction.

Figure 17:
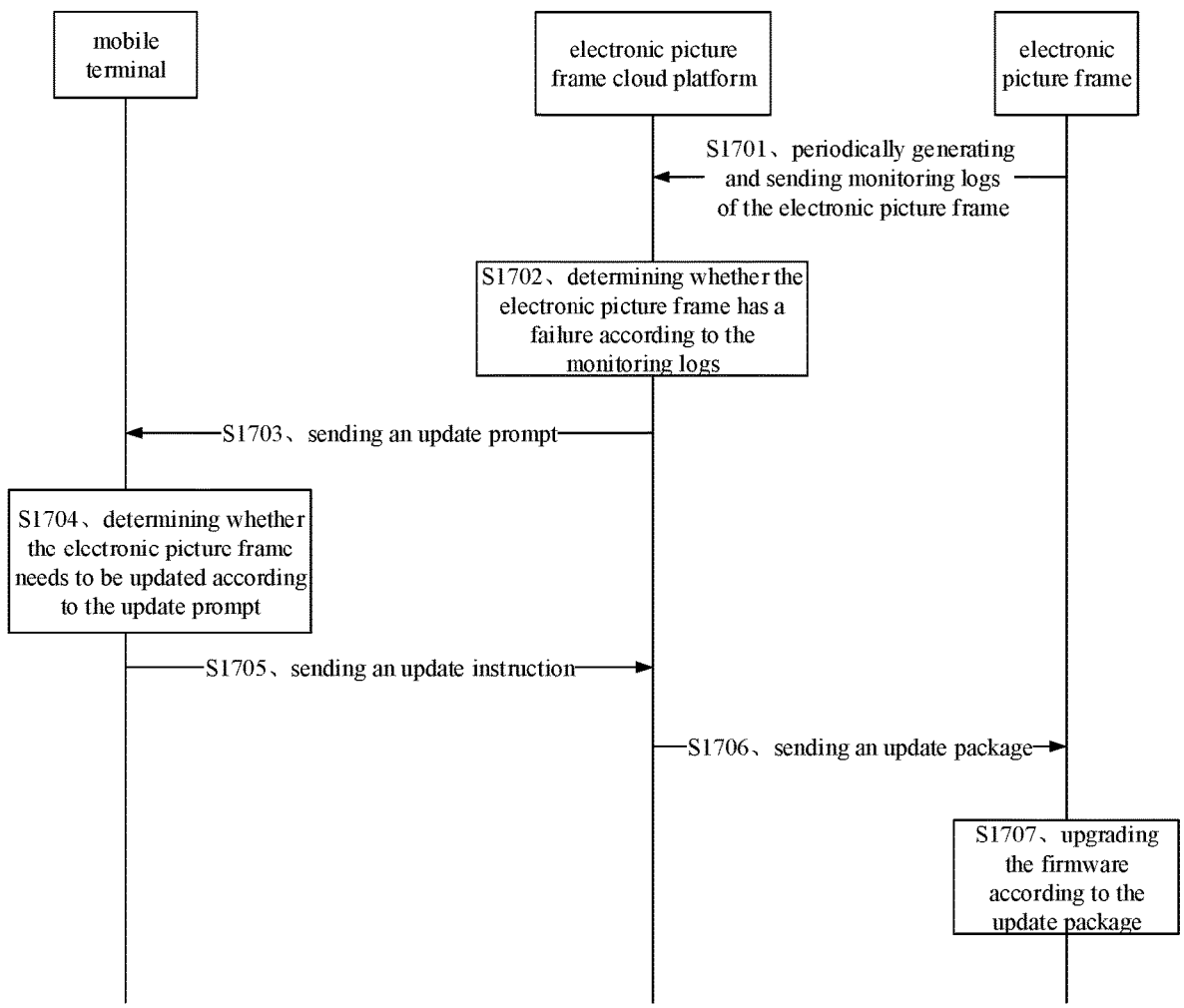
FIG. 17 is a diagram of an exemplary signaling interaction according to still another embodiment of the present disclosure.

FIG. 17 is a diagram of an exemplary signaling interaction according to still another embodiment of the present disclosure, which enables firmware upgrade of the electronic picture frame. As shown in FIG. 17, the signaling interaction includes the following steps:

S1701: periodically generating and sending to the electronic picture frame cloud platform monitoring logs of the electronic picture frame by the electronic picture frame;

S1702: determining, by the electronic picture frame cloud platform, whether the electronic picture frame has a failure according to the monitoring logs;

S1703: in response to determination of a failure in the electronic picture frame, sending, by the electronic picture frame cloud platform, an update prompt to the mobile terminal corresponding to the account information that has been bound to the Internet protocol address of the electronic picture frame;

S1704: determining, by the mobile terminal, whether the electronic picture frame needs to be updated according to the update prompt;

S1705: in response to determining that the electronic picture frame needs to be updated, sending an update instruction to the electronic picture frame cloud platform by the mobile terminal;

S1706: sending an update package to the electronic picture frame by the electronic picture frame cloud platform;

S1707: upgrading the firmware by the electronic picture frame according to the update package.

By means of the above descriptions of the embodiments, those skilled in the art can see clearly that embodiments of the present disclosure can be realized by hardware, software, firmware or any combinations thereof. Technical solutions in the embodiments of the present disclosure can be embodied in computer-executable instructions that may be stored in a non-volatile storage medium (e.g. CD-ROM, USB drive, mobile hard disk, etc.). Said computer-executable instructions, when being executed, enable execution of any one of the methods described in the embodiments of the present disclosure. Technical solutions in the embodiments of the present disclosure can be embodied in a computing device (e.g. personal computer, server, network device, etc.), said computing device comprises a processor and a memory, the memory stores computer-executable instructions, which when being executed by the processor, enable execution of any one of the methods described in the embodiments of the present disclosure.

Figure 18:
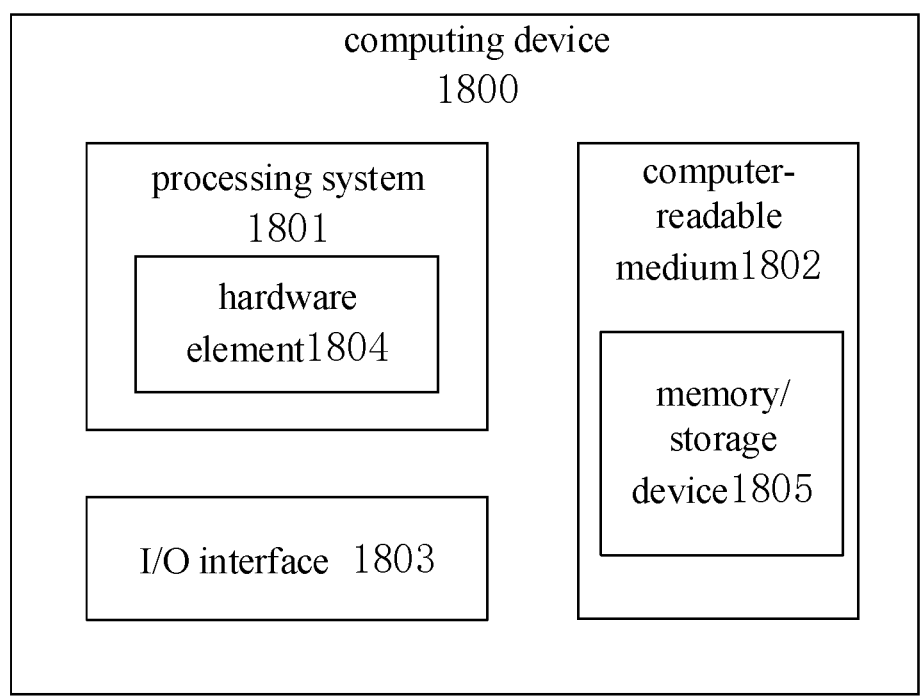
FIG. 18 shows an example computing device that can implement various technologies described in this disclosure.

FIG. 18 shows an example computing device 1800 that can implement various technologies described in this disclosure. The computing device 1800 may, for example, be a server of a service provider, a device (e.g. a client device) associated with a client, a system on chip and/or any other suitable computing device or computing system.

The example computing device 1800 as shown in the figure comprises a processing system 1801, one or more computer-readable mediums 1802 and one or more I/O interfaces 1803 coupled to one another communicatively. Although not shown, the computing device 1800 may further comprise a system bus for coupling various components or other data and command transmission systems.

The processing system 1801 represents functionality for performing one or more operations using hardware. Correspondingly, the processing system 1801 is shown in the figure as comprising a hardware element 1804 which can be configured as a processor, a functional module, etc. For example, the processor may be consisting of semiconductors and/or transistors (e.g. electronic integrated circuits (ICs)). In such a context, the processor-executable instruction can be electronic executable instruction.

The computer-readable medium 1802 is shown in the figure as comprising a memory/storage device 1805. The memory/storage device 1805 may include volatile mediums (such as random access memory (RAM)) and/or non-volatile mediums (such as read only memory (ROM), flash memory, optical disk, magnetic disk, etc.). The memory/storage device 1805 may include immobile mediums (e.g. RAM, ROM, immobile hard drive, etc.) and removable mediums (e.g. flash memory, removable hard drive, optical disk, etc.).

The one or more input/output interfaces 1803 represent functionalities for allowing users to inputting commands and information to the computing device 1800 through various input devices and allowing presentation of information to users and/or other components or devices through various output devices. Examples of the input device include keyboard, cursor control equipment (e.g. mouse), microphone (e.g. for voice input), scanner, touch functionality (e.g. capacitive or other sensors configured to detect physical touch), camera (e.g. using visible wavelength or non-visible wavelength like infrared frequency to detect movement, such as a gesture, involving no touch), etc. Examples of the output device include display device (e.g. monitor or projector), speaker, printer, network card, tactile response equipment and the like.

Various technologies might be described in general contexts of software and hardware elements or program modules herein. Generally speaking, such modules include routines, programs, objects, elements, components, data structures, etc. for performing specific tasks or implementing specific abstract data types. The terms "module", "functionality" and "component" as used herein generally mean software, firmware, hardware or combinations thereof. Features of the technologies described herein are irrelevant to any platform, namely, said technologies can be implemented on various computing platforms having various processors.

The software, hardware or program modules and other program modules can be implemented as one or more instructions and/or logics that are embodied on a certain form of computer-readable storage medium and/or through one or more hardware elements 1804. The computing device 1800 can be configured to execute specific instructions and/or functions corresponding to software and/or hardware modules.

In various implementations, the computing device 1800 may use various different configurations, such as a computer, a mobile device, a TV, etc. The technologies described herein can be supported by said various configurations of the computing device 1800, and they are not limited to the specific examples of the technologies described herein. The functionality can also be entirely or partially implemented by a distributed system, for example, it can be implemented on the "cloud". Those skilled in the art shall appreciate that the drawings are merely schematic drawings of certain exemplary embodiments, and the modules or flows in the drawings are not necessarily indispensable for implementing the present disclosure.

Those skilled in the art will understand that modules in the devices described in the embodiments can be distributed in the way described in the embodiments, or they can be distributed in other ways than that described in the embodiments. Modules in the embodiments can be combined into one module or divided into multiple sub-modules.

As recited in the above embodiments, after receiving the request for operating the electronic picture frame sent by the mobile terminal through the Internet protocol address of the electronic picture frame, the electronic picture frame cloud platform verifies the account information of the mobile terminal, and allows the mobile terminal to operate the electronic picture frame through the Internet protocol address of the electronic picture frame if the account information is verified to be the pre-stored account information bound to the Internet protocol address of the electronic picture frame; otherwise, it prohibits the mobile terminal to operate the electronic picture frame through the Internet protocol address of the electronic picture frame. By means of binding the mobile terminal to the Internet protocol address of the electronic picture frame on the electronic picture frame cloud platform, when mobile terminals want to operate the electronic picture frame through the Internet protocol address of the electronic picture frame, only those mobile terminals whose identities have been authenticated can control the electronic picture frame through the Internet protocol address of the electronic picture frame, thus preventing illegal users from performing any operation on the electronic picture frame and improving safety of display of the electronic picture frame.

Obviously, those skilled in the art can make various changes and modifications to the embodiments of the present disclosure without departing from the spirit and scope of the present disclosure. If these changes and modifications to the embodiments of the present disclosure fall into the scope of the claims of the present disclosure and their equivalents, then the present disclosure also intends to include said changes and modifications.

The invention claimed is:

1. A method for controlling an electronic picture frame, comprising:
   receiving a request for operating the electronic picture frame sent by a mobile terminal through an Internet protocol address of the electronic picture frame;
   acquiring account information of the mobile terminal;
   verifying whether the account information is pre-stored account information bound to the Internet protocol address of the electronic picture frame;
   in response to the account information being the pre-stored account information bound to the Internet protocol address of the electronic picture frame, sending a permission to the mobile terminal to allow the mobile terminal to operate the electronic picture frame through the Internet protocol address of the electronic picture frame;
   the method further comprising:
      receiving position information sent by the electronic picture frame at a predetermined time period;
      determining whether the electronic picture frame has moved out of a specified area according to the position information;
      in response to determining that the electronic picture frame has moved out of the specified area, sending a lock prompt to the mobile terminal corresponding to the account information that has been bound to the Internet protocol address of the electronic picture frame;
      receiving lock reply information sent by the mobile terminal in response to the lock prompt;
      in response to determining that the lock reply information is a lock instruction, sending a latch instruction to the electronic picture frame.

2. The method according to claim 1, further comprising:
   in response to the electronic picture frame being used for a first time:
      receiving a registration request carrying registration information of the electronic picture frame and identity information of the mobile terminal sent by the mobile terminal after scanning identification information of the electronic picture frame, wherein the registration information includes unique identity information of the electronic picture frame and the Internet protocol address of the electronic picture frame;
      verifying the identity information of the mobile terminal and after passing the verification, binding the account information to the Internet protocol address of the electronic picture frame and storing the account information and the Internet protocol address;
      sending to the mobile terminal the account information that has been bound to the Internet protocol address of the electronic picture frame.

3. The method according to claim 1, further comprising:
   receiving a plurality of monitoring logs sent periodically by the electronic picture frame;
   in response to determination of a failure in the electronic picture frame according to the monitoring logs, sending an update prompt to the mobile terminal corresponding to the account information that has been bound to the Internet protocol address of the electronic picture frame;
   receiving an update reply information sent by the mobile terminal in response to the update prompt;
   in response to determining that the update reply information is an update instruction, sending an update package to the electronic picture frame.

4. A method for controlling an electronic picture frame, comprising:
   sending a request for operating the electronic picture frame to an electronic picture frame cloud platform through an Internet protocol address of the electronic picture frame;
   receiving a request for acquiring account information sent by the electronic picture frame cloud platform;
   sending account information of a mobile terminal;
   receiving reply information sent by the electronic picture frame cloud platform after verifying whether the account information is pre-stored account information bound to the Internet protocol address of the electronic picture frame;
   in response to determining that the reply information is a permission allowing the mobile terminal to operate the electronic picture frame through the Internet protocol address of the electronic picture frame, operating the electronic picture frame through the Internet protocol address of the electronic picture frame;
   the method further comprising:
      receiving a lock prompt sent by the electronic picture frame cloud platform in response to determining that the electronic picture frame has moved out of a specified area;
      in response to determination of theft of the electronic picture frame according to the lock prompt, sending a lock instruction to the electronic picture frame cloud platform so that the electronic picture frame cloud platform sends a latch instruction to the electronic picture frame according to the lock instruction.

5. The method according to claim 4, further comprising:
   in response to the electronic picture frame being used for a first time:
      scanning identification information of the electronic picture frame to identify registration information of the electronic picture frame, wherein the registration information includes unique identity information of the electronic picture frame and the Internet protocol address of the electronic picture frame;
      sending to the electronic picture frame cloud platform a registration request carrying registration information of the electronic picture frame and identity information of the mobile terminal
      receiving the account information fed back by the electronic picture frame cloud platform after successful registration of the electronic picture frame and the mobile terminal and binding of the mobile terminal to the Internet protocol address of the electronic picture frame.

6. The method according to claim 4, further comprising:
receiving an update prompt sent by the electronic picture frame cloud platform in response to determination of a failure in the electronic picture frame;
in response to determining that the electronic picture frame needs to be updated according to the update prompt, sending an update instruction to the electronic picture frame cloud platform so that the electronic picture frame cloud platform sends an update package to the electronic picture frame according to the update instruction.

7. A method for controlling an electronic picture frame, comprising:
receiving an operation instruction sent, through an Internet protocol address of the electronic picture frame, by a mobile terminal that has passed verification on an electronic picture frame cloud platform;
operating on the electronic picture frame according to the operation instruction;
the method further comprising:
detecting and sending to the electronic picture frame cloud platform position information of the electronic picture frame at a predetermined time period;
receiving a latch instruction sent by the electronic picture frame cloud platform, wherein the latch instruction is generated by the electronic picture frame cloud platform according to a lock instruction sent by the mobile terminal in response to a lock prompt sent thereto, and the lock prompt is sent by the electronic picture frame cloud platform in response to determining that the electronic picture frame has moved out of a specified area according to the position information;
locking stored data according to the latch instruction and turning off display of data.

8. The method according to claim 7, further comprising:
periodically generating and sending to the electronic picture frame cloud platform a plurality of monitoring logs of the electronic picture frame;
receiving an update package sent by the electronic picture frame cloud platform, wherein the update package is generated by the electronic picture frame cloud platform according to an update instruction sent by the mobile terminal in response to an update prompt sent thereto, and the update prompt is sent by the electronic picture frame cloud platform in response to determination of a failure in the electronic picture frame according to the monitoring logs;
upgrading firmware according to the update package.

9. The method according to claim 7, further comprising:
automatically selecting an optimal way of connection from various ways of wireless connection to the electronic picture frame cloud platform or from hotspot connections to the mobile terminal so as to communicate data with the electronic picture frame cloud platform.

10. A non-transitory computer-readable storage medium storing computer-executable instructions that, when being executed by a computer, carries out the method claim 1.

11. A computing device, comprising:
a processor;
a memory storing computer-executable instructions that, when being executed by the processor, carries out the method of claim 1.

12. A non-transitory computer-readable storage medium storing computer-executable instructions that, when being executed by a computer, carries out the method of claim 4.

13. A computing device, comprising:
a processor;
a memory storing computer-executable instructions that, when being executed by the processor, carries out the method of claim 4.

14. A non-transitory computer-readable storage medium storing computer-executable instructions that, when being executed by a computer, carries out the method of claim 7.

15. A computing device, comprising:
a processor;
a memory storing computer-executable instructions that, when being executed by the processor, carries out the method of claim 7.

* * * * *